Dec. 21, 1926. 1,611,173
E. A. EOS ET AL
V-CLUTCH
Filed Nov. 16, 1925
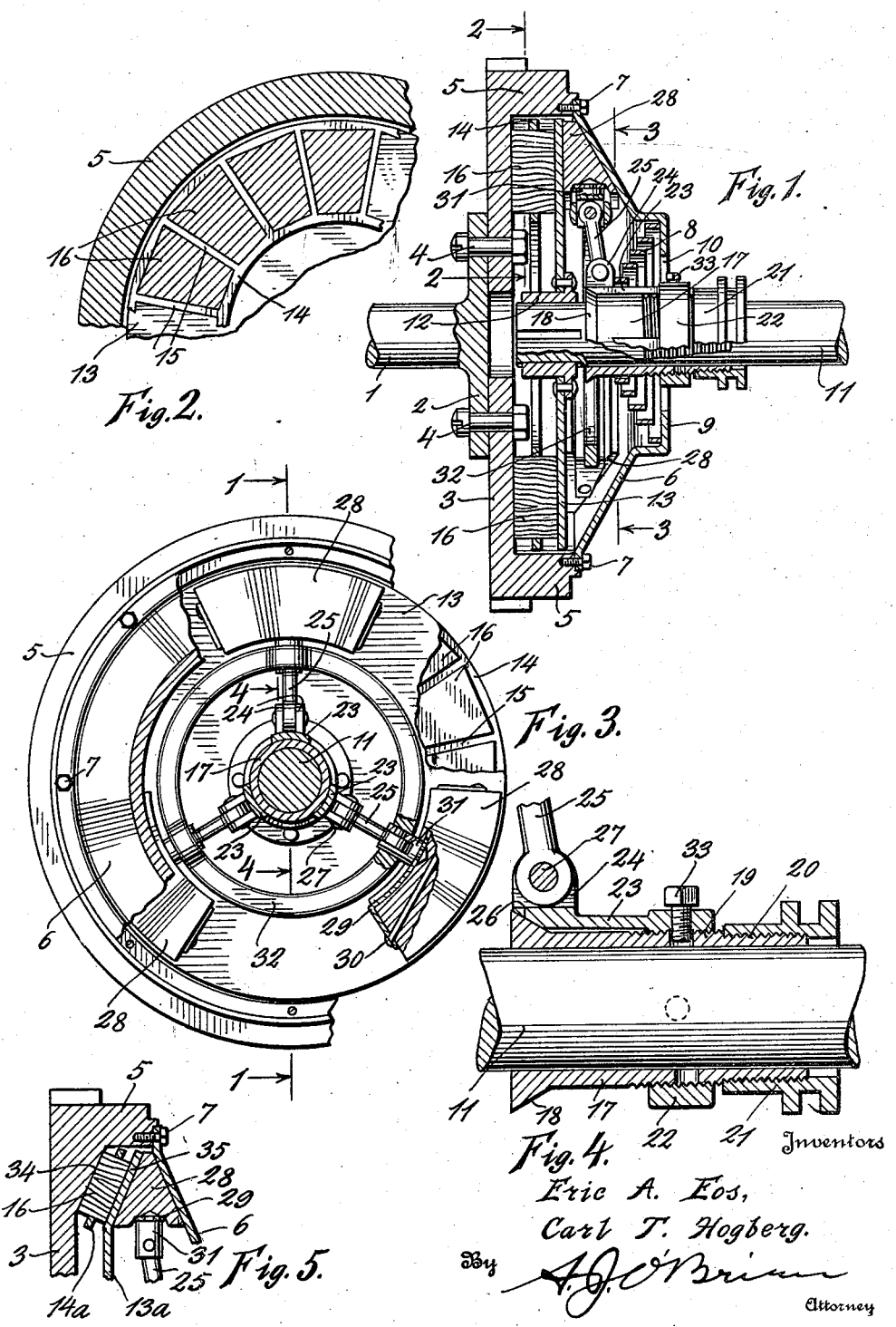
Inventors
Eric A. Eos,
Carl T. Hogberg.
By A. J. O'Brien
Attorney Patented Dec. 21, 1926.

1,611,173

UNITED STATES PATENT OFFICE.

ERIC A. EOS AND CARL T. HOGBERG, OF DENVER, COLORADO.

V CLUTCH.

Application filed November 16, 1925. Serial No. 69,273.

This invention relates to improvements in V-clutches of the type described and claimed in United States Letters Patent No. 1,554,206, granted to us on the 22nd day of September, 1925.

The object of this invention is to produce a clutch that shall have very few simple parts and which will not grab but gradually increase the friction whereby the engine and associated parts will never be subjected to the severe shocks that they so often experience where clutches are employed that do not possess the properties of initial yielding possessed by this clutch.

In the patent above identified a clutch of this type has been described and claimed. As the result of a series of experiments it has been found that the clutch shown and claimed in the above patent can be improved by making certain changes in the construction and it is for the purpose of obtaining protection for this improved construction that this application is filed.

In order to describe our invention so that its construction and operation can be clearly understood, we shall have reference to the accompanying drawing in which the present preferred embodiment of the invention is shown and in which:

Fig. 1 is a diametrical section taken on line 1—1, Fig. 3;

Fig. 2 is a section taken on line 2—2, Fig. 1;

Fig. 3 is a section taken on line 3—3, Fig. 1 with parts broken away to better disclose the construction;

Fig. 4 is a section taken on line 4—4, Fig. 3, and,

Fig. 5 is a fragmentary section similar to that shown in Fig. 1 showing a slightly modified form.

Numeral 1 designates a drive shaft, the end of which is provided with a flange 2 to which the fly wheel 3 is secured by means of bolts 4. This fly wheel has a circular recess whose outer wall is formed by the rim 5. A driving plate 6 of steel, or other suitable material, is secured to the rim 5 by means of bolts 7. This plate is somewhat conical in shape and has a circular recess for the reception of the conical coil spring 8. The flat end portion 9 has an opening 10 through which the driven shaft 11 extends. Secured to the end of shaft 11 by means of suitable splines is a hub 12 to which the driven plate 13 is secured. Located between the inner surface of the recess in the fly wheel 3 and the driven plate 13 is a friction ring comprising a ring 14 formed from a sheet metal plate and provided with a plurality of openings 15 in which friction blocks 16 are driven. This friction ring is freely rotatable within the recess in the fly wheel and is held centered by means of the ring 14. Slidably and rotatably associated with the shaft 11 is a sleeve 17 whose outer surface near the inner end is inclined in the manner indicated by numeral 18. The cylindrical portion of the outer surface of the sleeve 17 has two threaded portions 19 and 20 of different diameters. The end portion 20 is of smaller diameter than the portion 19 and secured to it is a member 21 which cooperates with parts not shown to reciprocate the sleeve on the shaft. Threadedly connected to the portion 19 is a ring 22 that has three arms 23 whose ends are each provided with a pair of spaced lugs 24 between which are pivotally secured the ends of the links 25. The arms 23 have their outer ends inclined along their inner surfaces in the manner indicated by numeral 26 in Fig. 4. These inclined surfaces are engaged by the conical surface 18 on the sleeve so that when the ring 22 is rotated in a direction to move the inclined surfaces together the ends of the arms 23 will be moved radially away from the axis of the sleeve 17 and thereby adjust the pivot 27 radially for the purpose of adjusting the parts to compensate for wear and for other purposes as will hereinafter appear. Located between the converging faces of the driving and driven plates 6 and 13 are wedge shaped shoes 28 of wood fiber or other suitable material. These shoes have a radial section that corresponds to the shape of the space between plates 6 and 13. A metal strap 29 is secured to the shoes 28 by means of rivets 30 and to these are secured cylindrical lugs 31 which have a diametrical slot extending inwardly from one end in which the outer ends of the links 25 are pivoted. The lugs 31 extend through radial holes in the ring 32 which is held in centered position by the action of these lugs. A conical coil spring 8 engages the lugs or ears 24 and tends to move the sleeve 17 inwardly and thereby move the shoes 28 radially outward through the toggle action of the links 25 in the manner apparent from Fig. 1. It is now clear that by moving the arms 23 radially by the expanding action of the inclined surface 18 the shoes 28 may be adjusted to compensate for wear or to produce greater pressure. A screw 33 is threadedly connected with the ring 22 and engages holes in the sleeve 17 for the purpose of holding the parts in adjusted position.

In Fig. 5 I have shown a slight modification in which the inner surface of the recess in the fly wheel has an annular portion 34 that is inclined. The ring 14ª differs from the ring 14 by being conical and the plate 13ª has a conical surface 35. The action is exactly the same as that obtained by the construction shown in Fig. 1, but as the angle between the plates may be made greater the pressure to obtain the same friction must be greater. The construction shown in Fig. 5 is especially well adapted for brakes which, when so constructed, may run in oil and will not burn out as readily as brakes of the present construction.

The rings 14 and 14ª serve to hold the friction blocks 16 in properly spaced and centered position and permit the blocks to move relative to the inner surface of the member 3 so that the wear will be distributed more or less evenly on both ends of the friction blocks.

Having now described our invention what we claim as new is:

1. A clutch comprising a fly wheel, a friction ring within said fly wheel, an outer plate secured to said fly wheel, a driven plate between said ring and outer plate, radially movable blocks between said plates, means for moving said blocks radially and adjusting means for said blocks for permitting compensation to be made for wear.

2. A clutch comprising a fly wheel having a circular recess, a friction ring within said recess, an outer drive plate secured to said fly wheel, a driven plate between said ring and said drive plate, one of said plates having a portion of its surface inclined towards the other plate so as to form an outwardly tapering space, radially movable blocks between said plates, means for moving the blocks in a radial direction, said means comprising a cylindrical sleeve that projects through an opening in the drive plate, toggle links connecting said sleeve to the blocks and means for adjusting the position of the links radially with respect to the axis of the sleeve.

3. A clutch comprising a fly wheel, having a circular recess, a friction ring within said recess, an outer drive plate secured to said fly wheel, a driven plate between said ring and said drive plate, one of said plates having a portion of its surface inclined towards the other plate so as to form an outwardly tapering space, radially movable blocks between said plates, means for moving the blocks in a radial direction, said means comprising a cylindrical sleeve that projects through an opening in the drive plate, toggle links connecting said sleeve to the blocks and means for adjusting the position of the links radially with respect to the axis of the sleeve.

4. A clutch comprising, in combination, a pair of opposed relatively rotatable members having their opposed faces converging toward their outer edges, means for preventing longitudinal separation of said members, a shaft secured to one of said members, a sleeve slidably and rotatably mounted on the shaft, said sleeve having a ring threadedly secured to the outer surface thereof, said ring having a plurality of arms extending longitudinally of the sleeve, said sleeve having an inclined annular surface at its end, said surface being adapted to engage the ends of said arms to move the same radially, wedge-shaped shoes mounted between said converging surfaces, links connecting said shoes to the ends of said arms and means comprising a spring for moving and holding said shoes in engagement with said surfaces.

5. A clutch comprising, in combination, a pair of opposed relatively rotatable members having their opposed faces converging toward their outer edges, means for preventing longitudinal separation of said members, a shaft secured to one of said members, a sleeve slidably and rotatably mounted on the shaft, said sleeve having a ring threadedly secured to the outer surface thereof, said ring having a plurality of arms extending longitudinally of the sleeve, said sleeve having an inclined annular surface at its end, said surface being adapted to engage the ends of said arms to move the same radially, wedge-shaped shoes mounted between said converging surfaces, links pivotally connected to the ends of said arms and to the shoes and means comprising a spring for moving said shoes outwardly into engagement with said converging surfaces.

In testimony whereof we affix our signatures.

ERIC A. EOS.
CARL T. HOGBERG.